Nov. 23, 1971  B. A. CAVALAN ET AL  3,621,745
SHEARING-ACTION ROD CUTTING DEVICE
Filed July 11, 1969  2 Sheets-Sheet 1
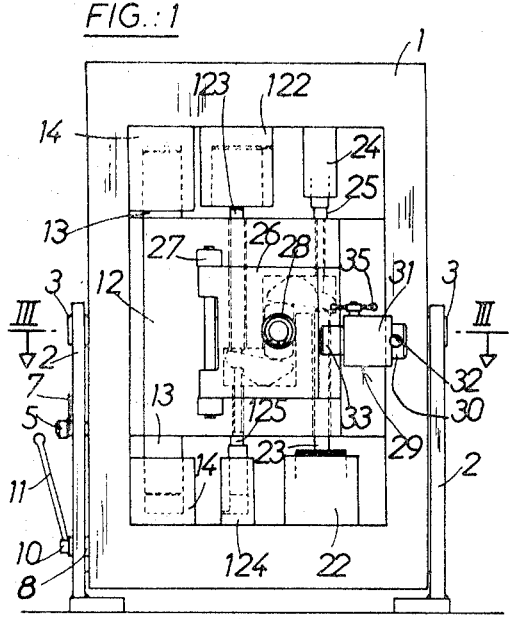
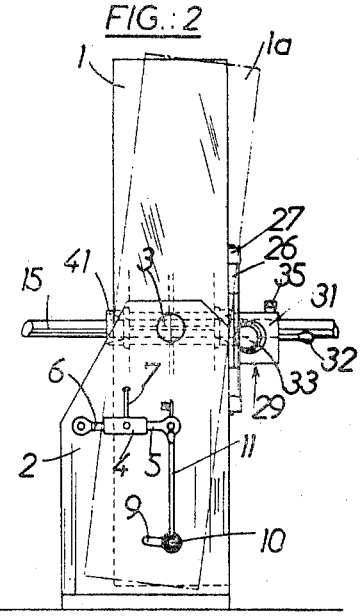
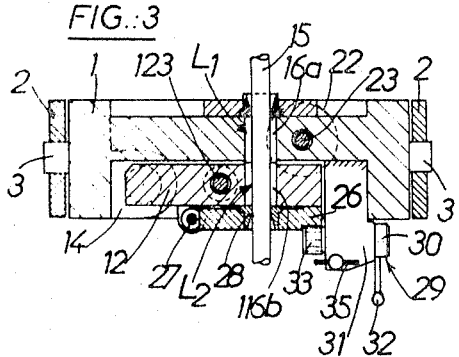
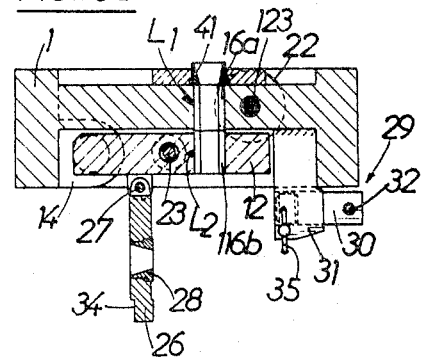
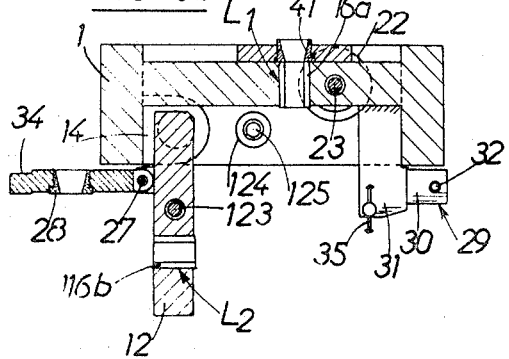
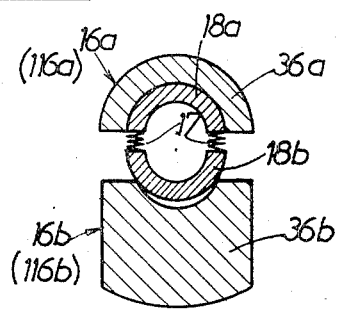

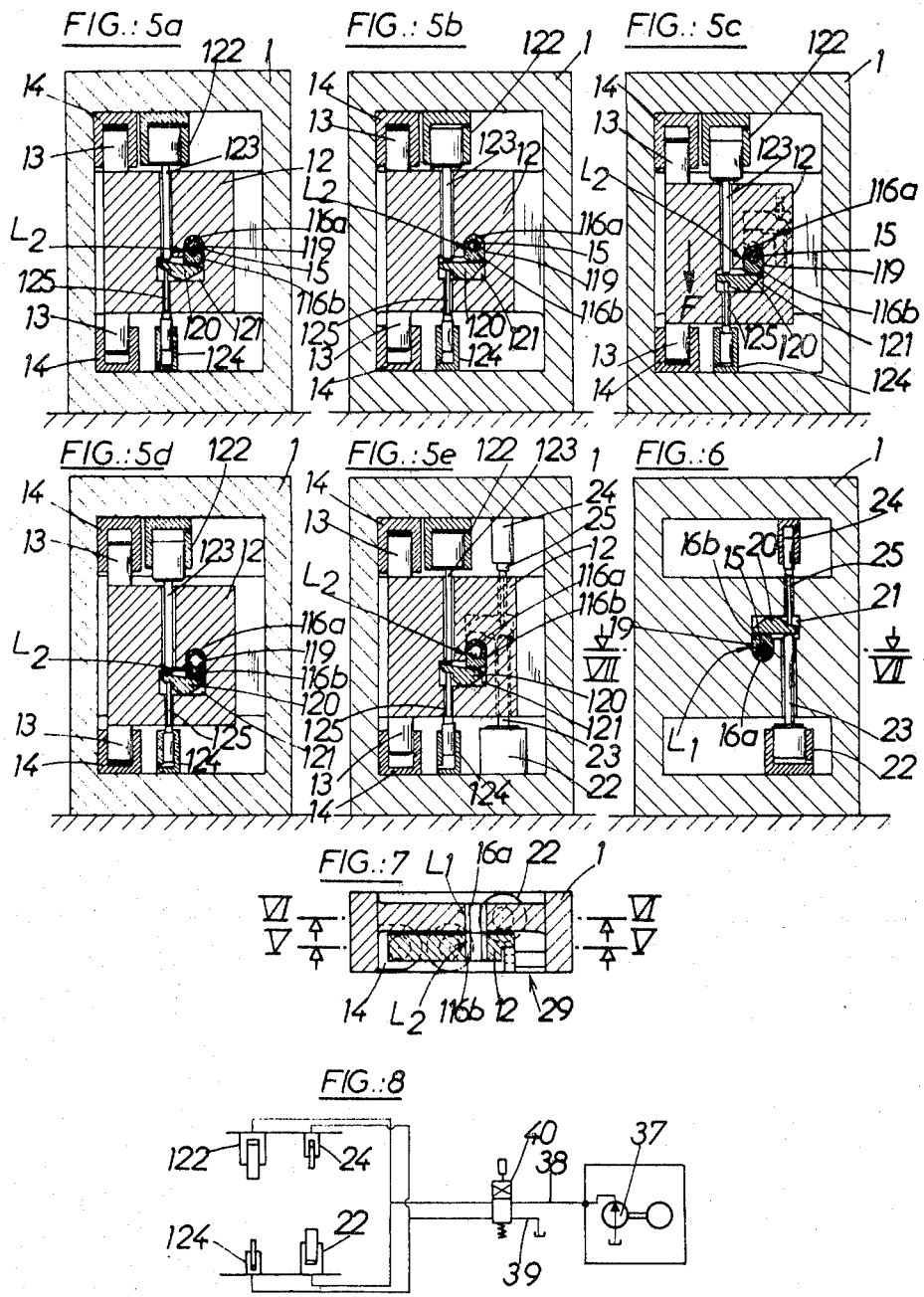

United States Patent Office
3,621,745
Patented Nov. 23, 1971

3,621,745
SHEARING-ACTION ROD CUTTING DEVICE
Bernard André Cavalan, Paris, and François Kropin, Verneuil-sur-Avre, France, assignors to Chevallier SA., Verneuil-sur-Avre, and Paul Sarda, Paris, France, fractional part interest to each
Filed July 11, 1969, Ser. No. 840,980
Claims priority, application France, July 16, 1968, 159,381
Int. Cl. B26d 1/00, 7/02
U.S. Cl. 83—198                                    12 Claims

ABSTRACT OF THE DISCLOSURE

A device for cutting a workpiece into lengths including a first die which is carried by a frame, a second die which is carried by a movable slider, means for clamping the workpiece in the die which is carried by the frame, and means, which are independent of the preceding ones, for successively clamping the workpiece in the die which is carried by the slider and giving said slider a translatory motion in relation to the frame, whereby the workpiece is sheared in the dividing plane between the two dies.

---

This invention relates to a device for cutting a workpiece into lengths, the cutting effect being obtained by a pure shearing action in a plane. As is well known this term implies a pure sliding action of the material parts on each other in the cutting plane, without torsion, and in general, without any accompanying tangential action, and it excludes therefore any relative rotation of components of the cutting device which are generally adapted to clamp the workpiece from either side of the shearing plane, which rotation would subject the said workpiece to a torque during the cutting process.

This device is suitable, among other things, for cold cutting up of metal rods whatever their shape, profile, cross section or hardness, and for producing short lengths or pieces with clean cutting planes, without burrs, ruptures or splits. In particular, in the case of soft metals which are especially sensitive to the above-mentioned tangential actions, these lengths or pieces are free from deformations or splintering.

The device which is described in this invention comprises in combination a first die which is carried by a frame, a second die which is carried by a movable slider adapted to perform a translatory motion in relation to the frame in a parallel direction to the shearing plane, said two dies being adapted to be positioned coaxially as an extension of each other on both sides of a dividing plane which coincides with the shearing plane so that the workpiece can be moved across the two dies, means for clamping the workpiece in the die which is carried by the frame, and means which are independent of the preceding ones for successively clamping the workpiece in the die which is carried by the slider and giving said slider a translatory motion in relation to the frame, whereby the workpiece is sheared in the dividing plane between the two dies.

According to a feature of the invention, each of these dies comprises two jaws which can be brought together by the action of the clamping means, so as to hold the workpiece at both sides of the shearing plane. One of these jaws may be fixed in relation to the machine-part, either the frame or the slider, by which it is carried, while the other slides in a guide which is integral with the said machine part. Preferably, the two jaws of each die are kept apart from each other, in the rest position, by an elastic system such as a spring assembly.

According to another feature of the invention, each jaw comprises a shell-half which is in direct contact with the workpiece and an intermediary support art which is in contact with the shell-half.

The inclusion of this intermediary support part was found to considerably reduce the risk of breaking the shell-halves. This risk is further reduced if the surfaces which are in contact with each other, on the workpiece and on at least one of the jaws (or of the shell-halves) holding this workpiece, have a different radius of curvature, the radius of curvature of the said jaw being slightly smaller than that of the workpiece. It is also preferable if the surfaces which are in contact with each other, on the shell-halves and on at least one of the associated intermediary support parts, also each have a different radius of curvature, the radius of curvature of the said intermediary support part being slightly smaller than that of the corresponding shell-half.

According to another feature of the invention, the means for clamping the workpiece in the die which is carried by the frame, comprise a rocking lever which is fitted in an aperture of the frame, the said lever resting on the one hand against the sliding jaw of the said die and on the other hand on the frame and being actuated by a control system for use by the operator. This control system may include a fluid jack with a fixed part which is integral with the frame, and a mobile part which actuates the rocking lever in the direction for clamping the workpiece. It may also include an auxiliary jack with a fixed part integral with the frame and a mobile part also actuating the same bell-crank lever, but in the direction for releasing the workpiece. This latter arrangement would, obviously, facilitate bringing the jaws into the rest position when the cutting operation is completed.

According to another feature of the invention, the means for successively clamping the workpiece in the die which is integral with the slider and giving this slider a translatory motion in relation to the frame, comprise a rocking lever, similar to the above-mentioned one, which is fitted in an aperture of the slider, the said lever resting on the one hand against the sliding jaw belonging to the said die and on the other hand against the slider, and being actuated by a control system for use by the operator.

As already mentioned hereinbefore, this control system is independent of the above-mentioned other control system, in other words, the clamping action of one of the dies is not transmitted, for instance through the workpiece, to the other die.

As in the case of the frame-die, this control system may include a fluid jack with a fixed part integral with the frame, and a mobile part which actuates the bell-crank lever in the direction for clamping the workpiece.

Similarly, an auxiliary jack may be included, with its fixed part integral with the frame and the mobile part also actuating the bell-crank lever in the direction for releasing the workpiece.

According to another feature of the invention the slider and the frame are inter-connected by guide means to permit the slider to perform said translatory motion in relation to the frame.

These guide means can also be used as pivots, to enable the slider to be swung away from the frame like a door, in order to facilitate access to the component parts of the frame die and its associated clamping means.

According to a further feature of the invention, the slider is also fitted, on its surface which is opposite the shearing surface, with a flap-door to allow access to the component parts of the slider-die and its associated clamping means. Means are also provided for locking the flap-door to the slider during operation and for preventing the said slider from pivoting in relation to the frame.

According to another feature of the invention, means are provided for varying the orientation of the assembly consisting of the frame and the slider in relation to a fixed reference surface like the ground. It is thus possible to use different types of jaws having different cutting angles and nevertheless to keep in a horizontal position the workpieces or rods to be cut. Feeding the machine is therefore simplified.

For a better understanding of the invention and to show how the same may be carried into effect, reference will now be made to the accompanying drawings in which:

FIG. 1 represents a general front view of a cutting device in accordance with the invention;

FIG. 2 represents a side view of the cutting device represented in FIG. 1;

FIG. 3 represents a cross-section, taken on the line III—III of FIG. 1, of the cutting device represented in FIG. 1, in the operational position;

FIGS. 3a and 3b are similar views to FIG. 3, showing the cutting device momentarily out of action and open;

FIG. 4 represents an enlarged cross-section of one of the clamping-jaws systems;

FIGS. 5a–5e are cross-section diagrams taken on the line V—V in FIG. 7, of a cutting device similar to that in FIG. 1, showing several successive phases of the cutting process;

FIG. 6 is a cross-section diagram taken on the line VI—VI in FIG. 7, of the same cutting device;

FIG. 7 represents a cross-section diagram taken on the line VII—VII of the cutting device represented in FIG. 6;

FIG. 8 is a diagram of a hydraulic control system of the device.

In FIGS. 1 to 4, reference 1 designates a frame which pivots on two fixed columns 2 by means of pins 3. The orientation of this frame in relation to the columns 2 may be modified by any appropriate means, for instance a threaded sleeve 4 in association with two reverse-threaded rods 5–6 which are integral with the frame 1 and one of the columns 2 respectively. Sleeve 4 may be operated by means of a lever 7 for use by the operator.

An inclined position of the frame 1 is shown as a broken line marked 1a. The frame can be blocked in the chosen position by means of a locking device comprising, for example, a finger 8, integral with frame 1 and projecting through a groove 9 in column 2. This finger operates in conjunction with a complementary part 10 which is fitted on a blocking lever 11, also for the operator's use.

An input funnel 41 is integral with the frame and leads to a feeding device for workpieces (especially bars or rods), which is not shown.

A slider 12 comprising, for example, a thick plate, is connected to the frame by means of a guide mechanism to permit the slider to perform a translatory movement in relation to the frame. This guiding mechanism may suitably comprise pivots 13, fitted on the plate, the said pivots working in association with pivot bearings 14, fitted on the frame. As shown in FIG. 3b, the slider 12 can be swung away from the frame like a door, by rotation round the common axis of the pivots and the pivot bearings, to facilitate access to the inside of the machine.

Two dies $L_1$ and $L_2$, which are carried respectively by the frame and the slider, can be positioned coaxially so as to form an extension of one another, and a workpiece, for instance a bar 15, may be moved across the dies.

Reference to FIG. 4 will show that each die may consist of two jaws 16a, 16b (die $L_1$), or 116a, 116b (die $L_2$), which are kept separate, in the rest position, by means of springs 17. These jaws can grip the workpiece either directly, or, preferably, through the intermediary of shell-halves 18a, 18b.

As will be seen in FIG. 6, die $L_1$ is fitted in a suitably shaped aperture or guide 19, in which one of the jaws 16a is fitted in a fixed position, while the other is slidable and can be brought together with the first, so as to grip the workpiece.

The machine includes means for causing this workpiece to be clamped in die $L_1$. The means for this purpose include in particular a rocking lever 20. This lever is fitted in an aperture 21 which connects with aperture 19 in the frame. The lever rests on the one hand on sliding jaw 16b and on the other hand on one of the walls of aperture 21 and can be operated by a control system for use by the operator. This control system may suitably include a jack 22, the fixed part of this jack (for example the cylinder) being integral with the frame, while the mobile part (piston) may operate, by means of a rod 23, the rocking lever 20 in the right direction for clamping the workpiece.

This control system may also include a less powerful auxiliary jack 24, the fixed part of which being integral with the frame and the mobile part operating, by means of a rod 25, the same rocking lever in the right direction for releasing the workpiece.

As will be seen from FIGS. 5a–5d, the die $L_2$ is fitted in the slider in much the same way as $L_1$ is fitted in the frame. The same reference numbers have been used to designate the corresponding parts in both cases, preceded by a "1" in the case of the parts of die $L_2$ which is fitted in the slider. There is, therefore, on these drawings, an aperture 119 for fitting the fixed jaw 116a and the mobile jaw 116b belonging to the die $L_2$, an aperture 121 connecting with the aperture 119 for fitting rocking lever 120 which corresponds to the rocking lever 20, a jack 122, with its fixed part integral with the frame and the mobile part operating, through a rod 123, the lever 120 in the right direction for clamping the workpiece, and an auxiliary jack 124 to work in the opposite direction, through rod 125. It will be seen that the clamping of the workpiece in the die $L_2$ is achieved by parts which are completely independent from those causing the workpiece to be clamped in the die $L_1$.

As will be seen in FIGS. 1 to 3b, the slider 12 is fitted with a flap door 26, linked at 27 to the slider proper, and including an outlet channel 28 as an extension of die $L_2$. In the open position (see FIGS. 3a and 3b), it provides access to the component parts of the slider die and its associated clamping devices. This facilitates in particular replacing the sets of jaws.

This flap door is normally closed (see FIGS. 1 and 3), and is kept in this position by means of a locking device with the general reference 29. This locking device comprises a bolt 30 which can slide and pivot in a bushing 31 which is integral with the frame. The bolt is operated by means of a hand lever 32. An eccentric roller 33 is fitted at one end of the bolt and engages in a hollow 34 in the flap door when the bolt has been pivoted in its bushing. The bolt can be blocked in its bushing by means of an auxiliary latch 35. It will be seen that when the flapdoor 26 is bolted in the closed position, the slider 12 comes to rest against the frame 1 and can only carry out a translatory motion in relation to the frame.

As will be seen from FIG. 4, the shell-halves 18a, 18b work in association with the intermediary support parts 36a, 36b, which have been included to reduce the risk of breakage of the shell-halves, especially if the contact surfaces of an intermediary part like 36b and a shell-half like 18b have different radii of curvature, with the radius of curvature of part 36b smaller than that of the shell 18b. For the same reason, it is advisable for the surfaces in mutual contact on at least one of the shell-halves and the workpiece to have different radii of curvature, the radius of the curvature of the said shell-half being smaller than that of the workpiece. In this way a certain amount of clamping elasticity is obtained in both cases.

The diagram in FIG. 8 represents the circuit diagram of a hydraulic control of the device. This circuit comprises in particular an oil pump 37, a high-pressure duct 38, a low-pressure duct 39, and an electrovalve 40 with two operating positions. In one of these positions the electrovalve supplies simultaneously the jacks 22 and 122 and causes the simultaneous clamping of the workpiece in the dies $L_1$ and $L_2$. In the other position the electrovalve supplies the auxiliary jacks 24 and 124 in the direction for releasing the workpiece.

We now proceed to the description of the operation of the cutting device, referring to the FIGS. 5a–5e and 6. In these drawings the frame 1 is shown resting on the ground, but obviously its orientation may be modified as described above.

In the relative positions of the slider and the frame as shown in FIGS. 5a and 6, the two dies $L_1$ and $L_2$ are arranged coaxially as an extension of each other, with their jaws kept open by means of the springs 17.

The workpiece or bar 15 is inserted through the inlet funnel 41, through the two dies, and electrovalve 40 is operated to actuate the jacks 22 and 122. The jack 22 works on the rocking lever 20, causing the jaw 16b to move towards the jaw 16a and locking bar 15 in die $L_1$. This bar is similarly locked in the die $L_2$ by jack 122 acting symmetrically on jaw 116b through the rocking lever 120. In the position as shown in FIG. 5b, bar 15 is held firmly in the dies $L_1$ nad $L_2$ on both sides of the plane of division between the two dies, by means of the clamping devices 22, 23, 20 on the one hand, and 122, 123, 120 on the other hand, acting independently from each other. It should be noted in particular, that clamping in one of the dies is not transferred to the other die through the workpiece.

Bar 15 being locked from both sides, jack 122 continues operating and causes in association with the guide parts 13–14, a translatory motion of slider 12 in the direction of arrow F (see FIG. 5c). The die $L_2$ is therefore no longer aligned with die $L_1$, and this causes the bar to be cut by a single shearing action in the plane of division of the two dies. This position is shown in FIG. 5c.

On completion of the cutting action, the electrovalve 40 is operated to make the jacks 22, 122 inoperative and to operate the jacks 24, 124. The jaws of both the dies are separated as shown in FIG. 5d, and the cut-off length can be ejected. By its motion the mobile part of the jack 124 causes the slider to return to its starting position, as shown in FIG. 5e, and the cycle as described above can recommence.

To carry out a check of the component parts of the machine, bolt 29 is released, flap-door 26 (see FIG. 3a) is opened and slider 12 is pivoted into the position as shown in FIG. 3b. This pivoting motion can be effected owing to the fact that the rods 123 and 125 are not integral with the pistons of the jacks 122 and 124, the pistons working the rods simply by thrust.

A different set of jaws can be fitted if desired, to present a different cutting angle. The horizontal position of the feed mechanism can however be maintained by varying the orientation of the assembly consisting of the frame 1 and the slider 12, as shown in FIG. 2.

What is claimed is:

1. A device for cutting a workpiece into lengths by a pure planar shearing action which comprises, in combination, a supporting frame; a slider mounted on said frame for relative translatory motion in a direction parallel to the shearing plane; a first die carried by the frame; a second die carried by the slider in aligned coaxial relation with said first die, said two dies being arranged on opposite sides of a dividing plane coinciding with the shearing plane, so that the workpiece can be introduced into the two dies, said second die comprising a first jaw which is fixed in relation to the slider and a second jaw mounted for sliding movement in said slider; means for positively clamping the workpiece in said first die; and independent means for successively positively clamping the workpiece in said second die and imparting said translatory motion to said slider; a rocking-lever carried by said slider for moving said second jaw, said rocking-lever having a first bearing surface directly engaging said slider and a second bearing surface engaging said sliding jaw, and a control system for actuating said rocking-lever, whereby, upon actuation of said rocking-lever, the workpiece is first clamped between the two jaws of the second die and thereafter the slider is given a translatory motion relative to the frame, whereby the workpiece is sheared in the dividing plane between the two dies.

2. A device as claimed in claim 1, wherein said control system includes a jack having a fixed part integral with the frame and a movable part adapted to actuate said rocking-lever in one direction for clamping the workpiece.

3. A device as claimed in claim 2, wherein said control system further includes an auxiliary jack having a fixed part integral with the frame and a movable part adapted to actuate said rocking-lever in the other direction for releasing the workpiece.

4. A device as claimed in claim 1, wherein the said first die comprises a first jaw fixed in relation to the frame and a second jaw mounted for sliding movement in the said frame, said means for positively clamping the workpiece in the said first die comprises a rocking-lever carried by the frame, said rocking-lever having a first bearing surface directly engaging said frame and a second bearing surface engaging said sliding jaw, and including a control system for actuating said rocking-lever, whereby, upon actuation of said rocking-lever, the workpiece is clamped between the two jaws of said first die.

5. A device as claimed in claim 4, wherein said control system includes a jack having a fixed part integral with the frame, and a movable part which actuates said frame-carried rocking-lever in the one direction for clamping the workpiece in the frame-carried die.

6. A device as claimed in claim 5, wherein said control system further includes an auxiliary jack having a fixed part integral with the frame, and a movable part which actuates said frame-carried rocking-lever in the other direction for releasing the workpiece.

7. A device for cutting a workpiece into lengths by a pure planar shearing action which comprises, in combination, a supporting frame, a slider mounted on said frame for relative translatory motion in a direction parallel to the shearing plane; a first die carried by the frame and a second die carried by the slider, said two dies being adapted to be positioned in aligned coaxial relation on opposte sides of a dividing plane coinciding with the shearing plane, so that the workpiece can be introduced into the two dies, each of said dies comprising two jaws which can be brought together so as to clamp the workpiece at both sides of the said dividing plane, each of said jaws including a shell-half having a surface which is in contact with a corresponding surface of the workpiece, and an intermediary supporting part having a surface which is in contact with an opposite surface of said shell-half, and independent means for clamping said workpiece in the respective jaws.

8. A device according to claim 7, wherein said surfaces on the workpiece and on at least one of said shell-halves which are in mutual contact have different radii of curvature, the radius of curvature of said surface on the shell-half being slightly smaller than that on the workpiece.

9. A device as claimed in claim 7, wherein said surfaces on the shell-halves and on at least one of the associated intermediary support parts which are in mutual contact have different radii of curvature, the radius of curvature of said surface on the said intermediary support part being slightly smaller than that on the corresponding shell-half.

10. A device for cutting a workpiece into lengths by a pure planar shearing action, which comprises, in combination, a supporting frame and a slider mounted on said frame for relative translatory motion in a direction parallel to the shearing plane; a first die carried by the frame and a second die carried by the slider, said two dies being adapted to be positioned in aligned coaxial relation on opposite sides of a dividing plane coinciding with the shearing plane, so that the workpiece may be introduced into the two dies, each of said dies including two jaws which can be brought together so as to clamp the workpiece at both sides of the said dividing plane; guide means interconnecting said slider and said frame to allow said slider to perform said translatory motion, said guide means also acting as pivots to enable the slider to be pivoted away from the frame to facilitate access to the component parts of the frame-carried die; means for clamping the workpiece in said frame-carried die and independent means for successively clamping said workpiece in said slider-carried die and imparting said translatory motion to said slider.

11. A device according to claim 10, wherein the slider is fitted on its side opposite to said dividing plane with a flap-door to allow access to the component parts of the slider-carried die, and further comprising means for locking said flap-door to the slider and for preventing said slider from pivoting in relation to the frame.

12. A device for cutting a workpiece into lengths by a pure planar shearing action, which comprises, in combination, a supporting frame and a slider mounted on said frame for relative translatory motion in a direction parallel to the shearing plane; a first die carried by the frame and a second die carried by the slider, said two dies being adapted to be positioned in aligned coaxial relation on opposite sides of a dividing plane coinciding with the shearing plane, so that the workpiece can be introduced into the two dies; each of said dies comprising two jaws which can be brought together so as to clamp the workpiece at both sides of the said dividing plane; and means for varying the orientation of the frame and the slider as an assembly in relation to a fixed reference surface such as the ground; means for clamping the workpiece in said frame-carried die and independent means for successively clamping said workpiece in said slider-carried die and imparting said translatory motion to said slider.

References Cited

UNITED STATES PATENTS

| 2,136,831 | 11/1938 | Vuilleumier | 83—198 X |
| 3,204,504 | 9/1965 | Bradlee | 83—198 |
| 3,451,298 | 6/1969 | Schaming | 83—198 |

WILLIAM S. LAWSON, Primary Examiner

U.S. Cl. X.R.

83—375, 454